(12) United States Patent
Rubaek et al.

(10) Patent No.: US 11,857,478 B2
(45) Date of Patent: Jan. 2, 2024

(54) PATIENT LIFTING ROBOT

(71) Applicant: Blue Ocean Robotics, ApS, Odense SØ (DK)

(72) Inventors: Thomas A. Rubaek, Odense SØ (DK); John Ostergaard, Odense SØ (DK); Rune K. Larsen, Odense SØ (DK); Helle Gaub, Odense SØ (DK)

(73) Assignee: Blue Ocean Robotics, ApS, Odense SØ (DK)

( * ) Notice: Subject to any disclaimer, the term of this patent is extended or adjusted under 35 U.S.C. 154(b) by 0 days.

(21) Appl. No.: 16/339,260

(22) PCT Filed: Oct. 2, 2017

(86) PCT No.: PCT/DK2017/050326
§ 371 (c)(1),
(2) Date: Apr. 3, 2019

(87) PCT Pub. No.: WO2018/065019
PCT Pub. Date: Apr. 12, 2018

(65) Prior Publication Data
US 2020/0038273 A1    Feb. 6, 2020

(30) Foreign Application Priority Data

Oct. 3, 2016 (DK) .......................... PA 2016 70779

(51) Int. Cl.
*A61G 7/10* (2006.01)
*A61G 7/053* (2006.01)
(Continued)

(52) U.S. Cl.
CPC .......... *A61G 7/1019* (2013.01); *A61G 7/053* (2013.01); *A61G 7/1048* (2013.01);
(Continued)

(58) Field of Classification Search
CPC .... A61G 7/1019; A61G 7/053; A61G 7/1048; A61G 7/1061; A61G 7/1074;
(Continued)

(56) References Cited

U.S. PATENT DOCUMENTS 5,560,054 A * 10/1996 Simon .................. A61G 7/1046
5/86.1
5,697,110 A * 12/1997 Campbell ............ A61G 7/1055
177/144

(Continued)

FOREIGN PATENT DOCUMENTS

DE 9404944 U1 7/1994
EP 0424344 A1 * 4/1991 ........... A61G 7/1063
(Continued)

OTHER PUBLICATIONS

International Search Report and Written Opinion from International Application No. PCT/DK2017/050326, dated Dec. 6, 2017.
(Continued)

*Primary Examiner* — Justin C Mikowski
*Assistant Examiner* — Alison N Labarge
(74) *Attorney, Agent, or Firm* — Donald J. Lecher; BUTZEL LONG

(57) ABSTRACT

There is provided a lifting robot suitable for lifting and transferring a person. Especially there is provided a patient lift apparatus with collapsible vertical and horizontal columns that allows the apparatus to change its height and width. Specifically there is provided a patient lifting robot having a frame for lifting and carrying persons. The frame has adjustable length and width, since the frame comprises two vertically collapsible columns for adjusting the height of the frame, and one horizontally collapsible beam for adjusting the width of the frame.

4 Claims, 5 Drawing Sheets

(51) Int. Cl.
*B25J 5/00* (2006.01)
*B25J 11/00* (2006.01)
*B25J 18/02* (2006.01)

(52) U.S. Cl.
CPC ............ *A61G 7/1061* (2013.01); *B25J 5/007* (2013.01); *B25J 11/009* (2013.01); *B25J 18/025* (2013.01); *A61G 2203/32* (2013.01)

(58) Field of Classification Search
CPC ..... A61G 2203/32; B25J 5/007; B25J 11/009; B25J 9/026; B25J 13/085
See application file for complete search history.

(56) References Cited

U.S. PATENT DOCUMENTS

| | | | | |
|---|---|---|---|---|
| 6,161,232 | A * | 12/2000 | Von Schroeter | A61G 7/1019 5/83.1 |
| 6,575,100 | B2 * | 6/2003 | Faucher | B66C 7/04 104/126 |
| 7,938,756 | B2 * | 5/2011 | Rodetsky | A61H 3/04 5/81.1 R |
| 8,099,806 | B2 * | 1/2012 | Chepurny | A61G 7/1042 5/81.1 R |
| 9,248,065 | B1 | 2/2016 | Tu | |
| 2002/0045568 | A1 | 4/2002 | Hotten | |
| 2004/0160103 | A1 * | 8/2004 | Aono | A61G 5/125 297/330 |
| 2006/0260502 | A1 * | 11/2006 | Hjort | A61G 7/1015 104/93 |
| 2007/0000049 | A1 | 1/2007 | White | |
| 2007/0124858 | A1 | 6/2007 | Ahlman | |
| 2011/0238217 | A1 | 9/2011 | Kume | |
| 2012/0023661 | A1 | 2/2012 | Ota | |
| 2012/0159706 | A1 * | 6/2012 | Capaldi | A61G 7/1046 5/85.1 |
| 2012/0291197 | A1 * | 11/2012 | Martin | A61G 7/1042 5/85.1 |
| 2014/0137323 | A1 * | 5/2014 | Fernie | A61G 7/1019 5/83.1 |
| 2015/0051519 | A1 * | 2/2015 | Morbi | A61H 1/02 601/26 |
| 2019/0060150 | A1 * | 2/2019 | Saayman | A61G 7/1048 |
| 2020/0038273 | A1 | 2/2020 | Rubaek | |

FOREIGN PATENT DOCUMENTS

| | | |
|---|---|---|
| EP | 0858311 A1 | 8/1998 |
| EP | 0962211 A1 | 12/1999 |
| GB | 2337743 A | 12/1991 |
| GB | 2337743 | 12/1999 |
| WO | 2005032446 A1 | 4/2005 |

OTHER PUBLICATIONS

International Search Report and Written Opinion for App. No. PCT/IB2021/057768, dated Jan. 31, 2022, 17 pages.

* cited by examiner

PATIENT LIFTING ROBOT

This application is a National Stage Application of International Application No. PCT/DK2017/050326, filed 2 Oct. 2017, which claims benefit of Serial No. PA 2016 70779, filed 3 Oct. 2016 in Denmark and which applications are incorporated herein by reference. To the extent appropriate, a claim of priority is made to each of the above disclosed applications.

FIELD OF INVENTION

The present invention relates to a lifting robot suitable for lifting and transferring a person. More particularly, the invention relates to a patient lift apparatus with collapsable vertical and horizontal columns that allows the apparatus to change its height and width.

BACKGROUND OF THE INVENTION

EP0858311 discloses a patient lifting robot having a frame for lifting and carrying persons, said frame having adjustable length and width, wherein the frame comprises two vertically collapsible columns for adjusting the height of the frame, and one horizontally collapsible beam for adjusting the width of the frame. EP0962211 and U.S. Pat. No. 9,248,065 disclose similar features as above.

EP0858311 further describes that the vertically collapsible columns, and the horizontally collapsible beam is selected from telescopic/scissor joints. U.S. Pat. No. 9,248,065 discloses that in the patient lifting robot vertically collapsible columns are comprised of a sliding trolley with a hoist system connected to the horizontally collapsible beam.

Common for these prior art systems is that they are not actively and/or automatically moving the carried person. There is a need to improve the patient lifting robot to enable the user to more autonomously move the person to be carried.

SUMMARY OF THE INVENTION

The present invention provides a patient lifting robot having a frame for lifting and carrying persons, said frame having adjustable length and width, wherein the frame comprises two vertically collapsible columns for adjusting the height of the frame, and one horizontally collapsible beam for adjusting the width of the frame.

Preferably the vertically collapsible columns, and said horizontally collapsible beam are selected from telescopic joints, scissor lifts, hydraulic lifts and electrical actuators.

In a preferred embodiment the vertically collapsible columns are comprised of a sliding trolley with a hoist system connected to the horizontally collapsible beam. The robot may be controlled by one or more of load sensors, potentiometers, strain gauges, capacitive sensors, piezoresistive or piezoelectric sensors, or any other types of sensors that are capable of detecting forces exerted by a user.

In one aspect of the present invention the patient lifting robot further comprises a base assembly below both collapsible columns that is comprised of omni-directional driving mechanism for moving the robot in any direction on a surface.

In another aspect of the present invention the patient lifting robot further comprises an interface for human-robot interaction, enabling the user to inter alia adjust height, width of collapsible expandable columns and beam, set/reset movement speed.

Preferably the patient lifting robot has a battery charging module that mates with a mobile robot battery plug module, and an alignment system that aligns the battery plug module with the battery charging module.

In a particularly preferred embodiment the frame can be collapsed by means that elevates the base from the ground in the docking or storage mode. It is further preferred that the robot is provided with means for autonomous driving.

DETAILED DESCRIPTION OF THE INVENTION

Below the invention is described in more detail with reference to preferred aspects and embodiments thereof.

Figure 1:
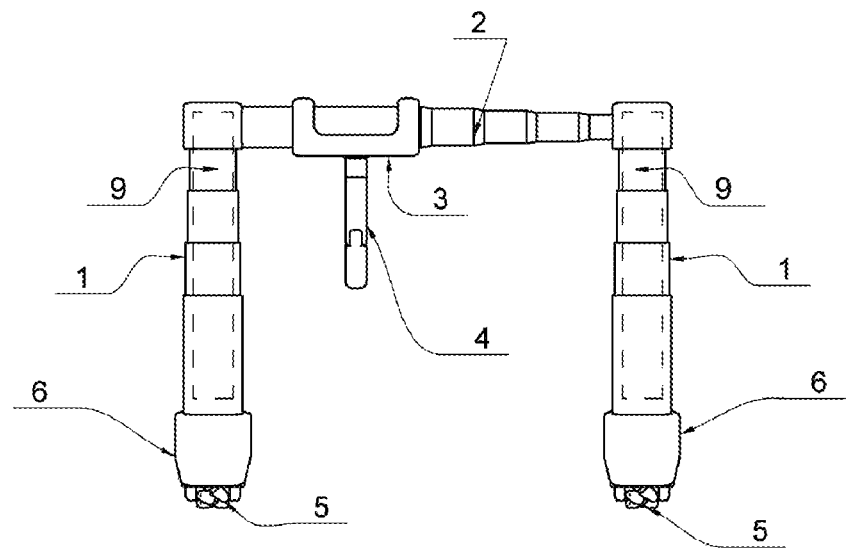
FIG. 1 is a schematic diagram illustrating the structure of the telescopic collapsible column, the sliding trolley, interchangeable hook and the telescopic collapsible beam.
Figure 2:
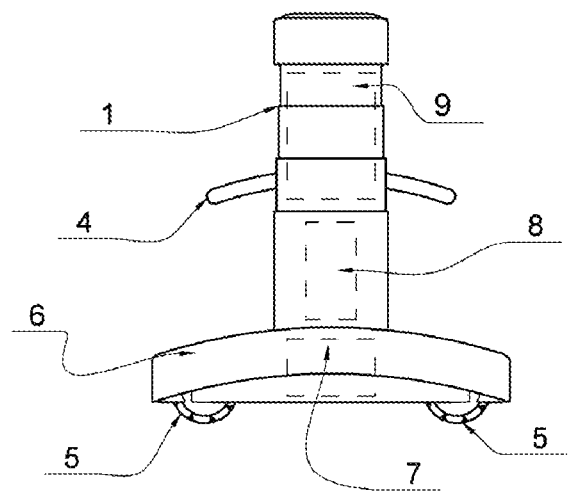
FIG. 2 is the side view structure showing the position of force control sensing, human-robot interaction device and the battery housing.
Figure 3:
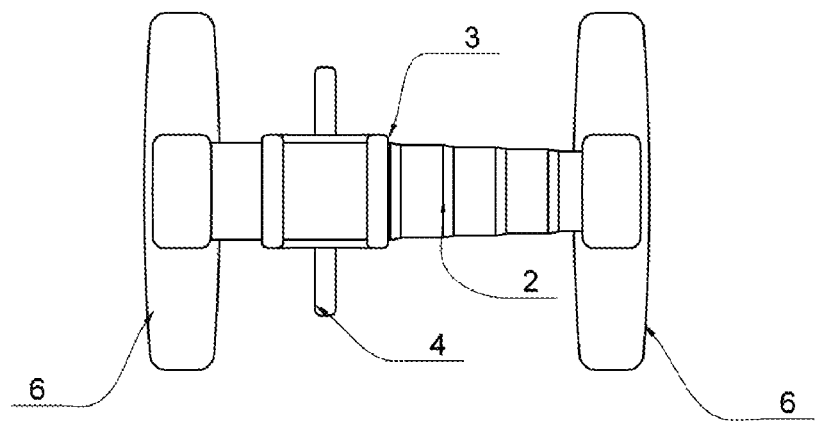
FIG. 3 is a top-view representing footprint of the multi-tower.

The present invention as shown in FIG. 1, includes a patient lifting robot with two telescopic collapsible columns 1 and one telescopic collapsible beam 2, sliding trolley 3 with an interchangeable hook 4, base with omni-directional driving mechanism 5 that have capacity for moving in any direction on a surface, base assembly 6, battery housing 7, an interface allowing human-robot interaction 8 and force control sensing 9.

Telescopic columns 1 are generally formed from several tubes of different sections, adapted to slide in each other through the presence of linear guide means disposed over the length of these tubes between each of them. The present invention is comprised of two vertical telescopic collapsible columns, and one horizontal telescopic collapsible beam 2 which collapse and expand to a plurality of heights and widths.

Figure 4:
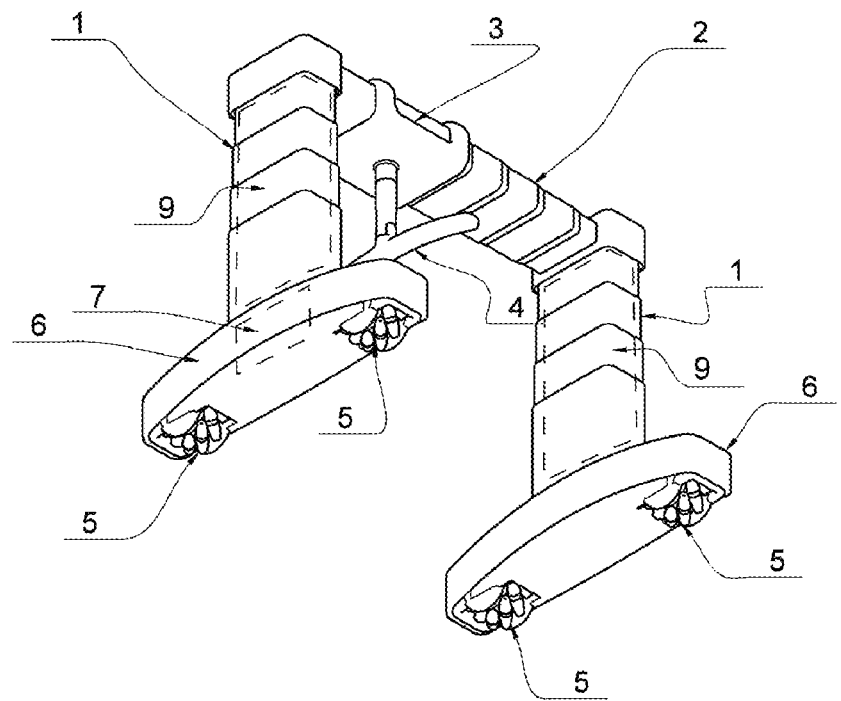
FIG. 4 is a three-dimensional schematic diagram illustrating the location and structure of the omni-directional driving mechanism and the interface on the sliding trolley where a plurality of hooks may be attached.
Figure 5:
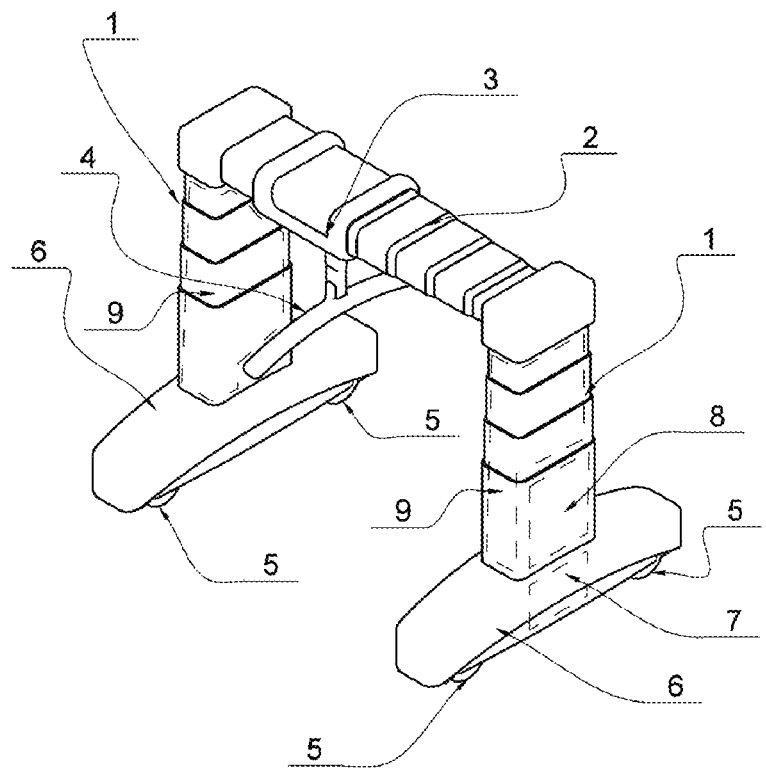
FIG. 5 is a three-dimensional schematic diagram illustrating interface on the sliding trolley where a plurality of hooks may be attached.
Figure 6:
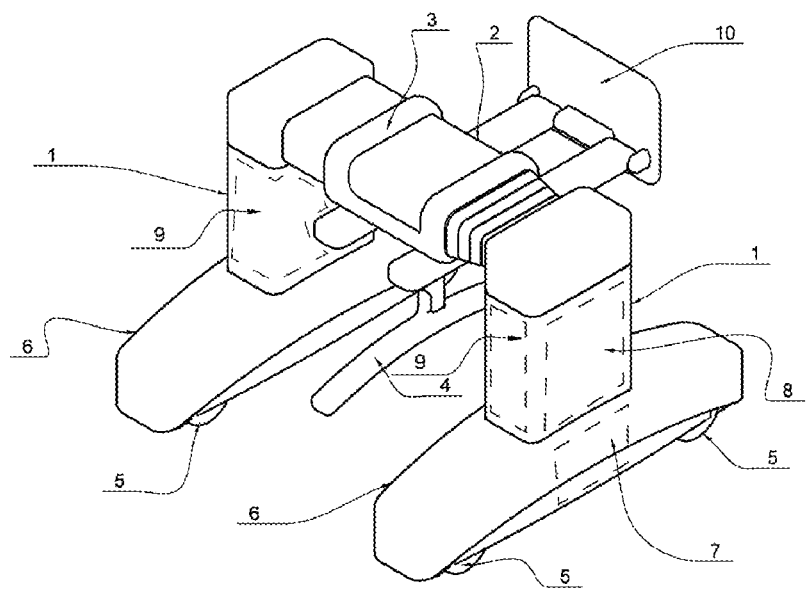
FIG. 6 is a three-dimensional schematic diagram illustrating the smallest length of the telescopic collapsible column and the location and structure of battery plug and charging module.
Figure 7:
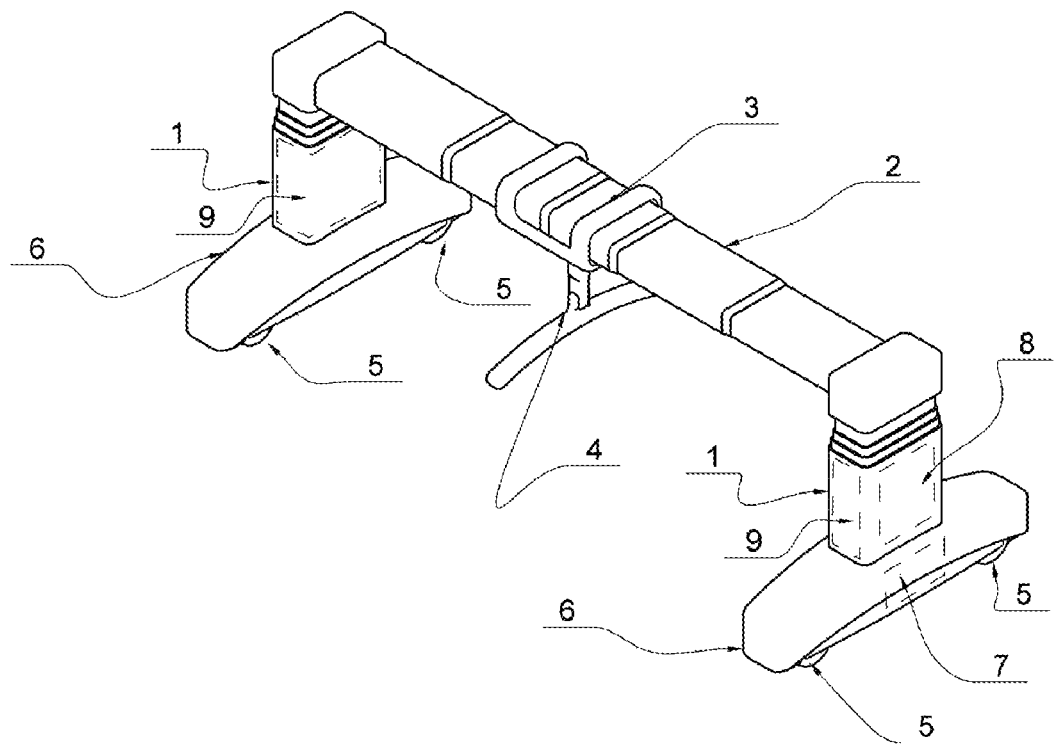
FIG. 7 is a three-dimensional view illustrating the largest width of telescopic collapsible beam.
Figure 8:
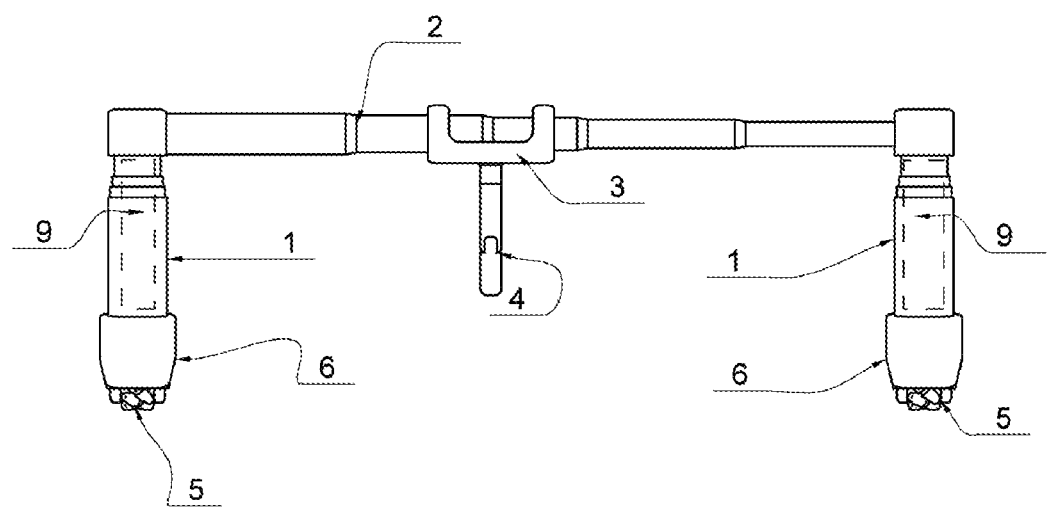
FIG. 8 is a front view illustrating largest width of telescopic collapsible beam.
Figure 9:
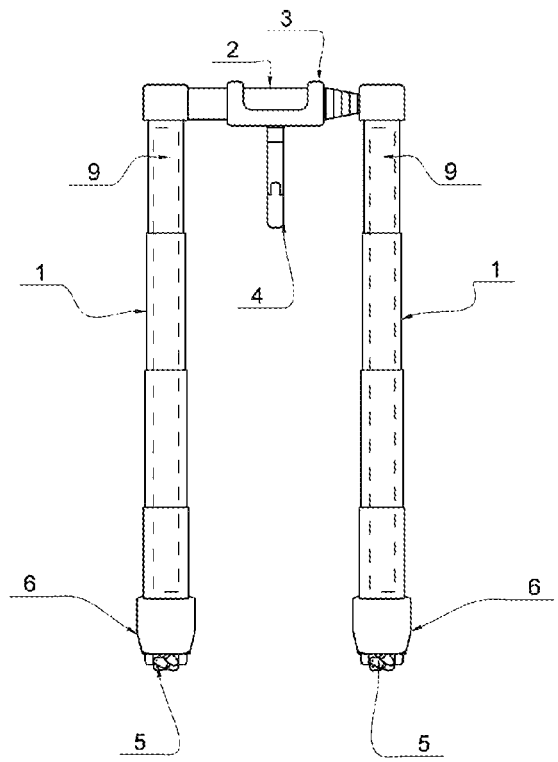
FIG. 9 is front view illustrating largest height of the telescopic collapsible columns.
Figure 10:
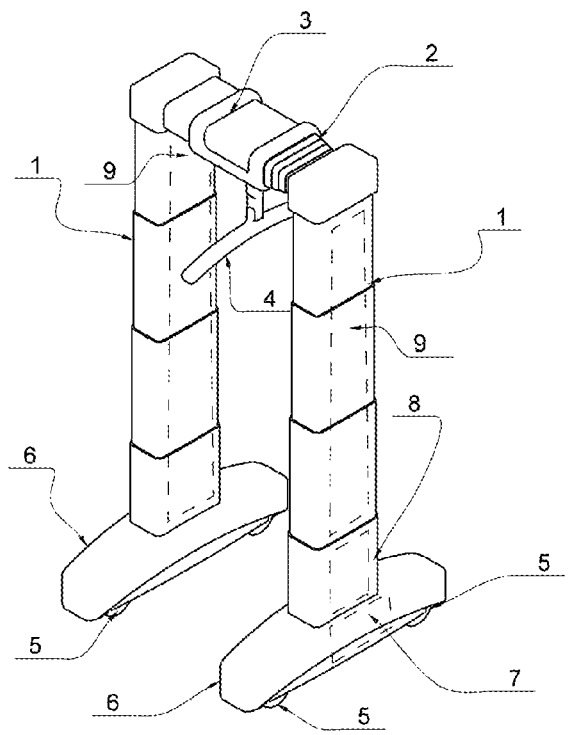
FIG. 10 is a three-dimensional view illustrating the largest height of telescopic collapsible columns.

An omni-directional driving mechanism 5 and its position within the base assembly 6 for movement of mobile robot of the invention can be seen in FIG. 4 that enable the robot to have capacity for moving in any direction on a surface using multiple rollers that when used in pairs, allows vehicle motion in any direction (i.e., holonomic motion). Omnidirectional driving is so as to enable effective and efficient movement of the robots on a work surface. Such movement is made possible through the wheels being individually driven.

The patient lifting robot is controlled by force sensing control 9. The user can move the robot forwardly with a forward force and backwardly with a rearward force. This action may be detected by one or more of load sensors, potentiometers, strain gauges, capacitive sensors, piezoresistive or piezoelectric sensors, or any other types of sensors that are capable of detecting forces exerted by a user, and used to control the powered movement of patient lifting robot.

As was noted above, force sensors may include load cells, potentiometers, strain gauges, capacitive, piezoresistive or piezoelectric sensors, or any other types of sensing structures that are capable of detecting forces exerted by a user thereon. Typically such force sensors are arranged or configured so as to detect any and all force components that are exerted in generally any horizontal orientation, or that have any horizontal components to them.

In one exemplary embodiment the patient lifting robot further includes an intuitive interface for human-robot interaction 8 that may be a touch display module, providing an easy-to-use interface without significant preparation time.

Hoisting systems for internally moving persons is an important part of the equipment in e.g. a hospital or a nursing home. These enable moving entirely or partially immobile persons or inhabitants between their bed, toilet, bath or other place of stay, without the care assistants having to do heavy lifting. Hoisting systems of this type often consist of an overhead rail system with a trolley that enables horizontal displacement, and a hoisting system suspended from the trolley that enables vertical displacement. The disclosed invention contains a sliding trolley allowing horizontal movement and a hoisting function carried out by the vertical telescopic collapsible columns 1 allowing vertical movement with an interchangeable hook 4.

The patient lifting robot is wireless and thus must operate on battery power. The system also includes a battery charging module 10 that mate with the mobile robot battery plug module, and an alignment system that aligns the battery plug module with the battery charging module.

The invention claimed is:

1. A patient lifting robot comprising:
   a frame configured to lift and carry persons and be adjustable in a height and a width, wherein the frame includes
      two vertical telescopically adjustable columns configured to control the height of the frame with one of electrical and hydraulic actuators, the two vertical telescopically adjustable columns being configurable in an extended configuration and a collapsed configuration having a shorter vertical length than the extended configuration, and
      one horizontal telescopically adjustable beam configured to control the width of the frame with one of electrical and hydraulic actuators;
   a base assembly below each of the two vertical telescopically adjustable columns, each of the base assemblies comprising an omni-directional driving mechanism configured to move the robot in any direction on a surface; and
   a battery plug module configured to electrically mate with an external battery charging module capable of charging a battery power supply in a battery housing of the patient lifting robot; and
   wherein collapsing the two vertical telescopically adjustable columns of the patient lifting robot to the collapsed configuration is configured to align the patient lifting robot with the external battery charging module to thereby charge the battery power supply in the battery housing.

2. The patient lifting robot of claim 1, wherein said two vertical telescopically collapsible columns are comprised of a sliding trolley with a hoist system connected to the horizontal telescopically collapsible beam.

3. The patient lifting robot of claim 1, wherein the patient lifting robot is controlled by force sensing control in response to one or more of load sensors, potentiometers, strain gauges, capacitive sensors, piezoresistive sensors, or piezoelectric sensors being arranged along the two vertical telescopically collapsible columns.

4. The patient lifting robot of claim 1, further comprising an interface for human-robot interaction, enabling the user to adjust height, width of the two vertical telescopically collapsible columns and the horizontal telescopically collapsible beam, and set and reset movement speed.

* * * * *